United States Patent
Breen et al.

(10) Patent No.: US 10,660,412 B2
(45) Date of Patent: May 26, 2020

(54) CORD FIXTURE

(71) Applicant: TULLI PTY LTD, Clayfield, Queensland (AU)

(72) Inventors: Graeme Breen, Clayfield (AU); Benjamin Charles Plant, Cashmere (AU)

(73) Assignee: TULLI PTY LTD, Clayfield, Queensland (AU)

( * ) Notice: Subject to any disclaimer, the term of this patent is extended or adjusted under 35 U.S.C. 154(b) by 320 days.

(21) Appl. No.: 14/783,995

(22) PCT Filed: Apr. 10, 2014

(86) PCT No.: PCT/AU2014/000392
§ 371 (c)(1),
(2) Date: Oct. 12, 2015

(87) PCT Pub. No.: WO2014/165918
PCT Pub. Date: Oct. 16, 2014

(65) Prior Publication Data
US 2016/0066658 A1 Mar. 10, 2016

(30) Foreign Application Priority Data
Apr. 11, 2013 (AU) .................. 2013204064

(51) Int. Cl.
*F16G 11/00* (2006.01)
*A44B 13/00* (2006.01)
*B60P 7/08* (2006.01)
*F16G 11/14* (2006.01)
*F16G 11/10* (2006.01)

(52) U.S. Cl.
CPC ........ *A44B 13/0029* (2013.01); *B60P 7/0823* (2013.01); *F16G 11/103* (2013.01); *F16G 11/143* (2013.01); *F16G 11/146* (2013.01)

(58) Field of Classification Search
CPC .................... A44B 13/0029; B60P 7/0823
See application file for complete search history.

(56) References Cited

U.S. PATENT DOCUMENTS 123,340 A * 2/1872 Fiester .................... F16B 45/00
 24/265 H
195,400 A * 9/1877 Richard .................. F16G 11/04
 403/275

(Continued)

FOREIGN PATENT DOCUMENTS

GB 2270109 A 3/1994

OTHER PUBLICATIONS

International Search Report Application No. PCT/AU2014/000392; dated May 2, 2014.

*Primary Examiner* — Jason W San
(74) *Attorney, Agent, or Firm* — Miller, Matthias & Hull LLP

(57) ABSTRACT

The present invention is directed to a cord fixture for attachment to a cord. The cord fixture includes a body having at least one side wall, and a slot in the at least one side wall for retaining the cord therein when the cord is in a fixed condition. The slot has a neck portion and an enlarged end portion adjacent the neck portion. The neck portion is configured to guide the cord into the enlarged end portion such that the cord can be releasably retained within the enlarged end portion.

23 Claims, 5 Drawing Sheets

(56) References Cited

U.S. PATENT DOCUMENTS

| | | | | |
|---|---|---|---|---|
| 479,509 | A | * | 7/1892 | Heaphy, Jr. ............. F16G 11/10 24/130 |
| 1,176,177 | A | * | 3/1916 | Sparks .................. A01K 65/00 16/DIG. 12 |
| 1,366,212 | A | * | 1/1921 | Pollard .................. F16G 11/00 24/129 B |
| 2,981,990 | A | * | 5/1961 | Balderree, Jr. .... B65D 33/1625 24/129 B |
| 3,636,594 | A | | 1/1972 | Faivre |
| 4,222,157 | A | * | 9/1980 | Forman ................ F16G 11/103 24/129 A |
| 4,355,444 | A | * | 10/1982 | Haney .................. F16G 11/143 24/129 B |
| 4,368,999 | A | * | 1/1983 | Morel .................. F16G 11/101 24/537 |
| 4,432,121 | A | * | 2/1984 | Dupre .................... F16B 45/00 24/343 |
| 4,622,724 | A | * | 11/1986 | Dupre .................... F16B 45/00 24/130 |
| 4,831,692 | A | * | 5/1989 | Chuan .................. F16G 11/046 24/129 B |
| 4,998,495 | A | * | 3/1991 | Bos ........................ B63B 59/02 114/218 |
| 5,119,539 | A | * | 6/1992 | Curry ...................... A43C 7/00 24/130 |
| 5,317,788 | A | * | 6/1994 | Esposito .................... B62J 7/08 24/300 |
| 5,651,633 | A | * | 7/1997 | Howe ...................... E04H 15/64 135/135 |
| 5,682,652 | A | * | 11/1997 | Brody .................. B60P 7/0823 24/130 |
| D417,386 | S | * | 12/1999 | Huston ........................ D8/367 |
| 6,012,204 | A | | 1/2000 | Roethler |
| 6,094,784 | A | * | 8/2000 | Schrader ............... B60P 7/0807 24/136 R |
| 6,308,383 | B1 | * | 10/2001 | Schrader ............... B60P 7/0807 24/136 R |
| D458,831 | S | * | 6/2002 | Selby ........................... D8/367 |
| 6,401,309 | B1 | * | 6/2002 | Yang .................... F16G 11/046 24/115 H |
| 6,427,298 | B1 | * | 8/2002 | Tseng ...................... A43C 9/04 24/712 |
| D478,805 | S | * | 8/2003 | Winig ........................... D8/367 |
| 6,735,829 | B2 | * | 5/2004 | Hsu .......................... A43C 3/00 24/130 |
| 6,851,163 | B2 | * | 2/2005 | Selby ........................ B62J 7/08 114/218 |
| 6,938,306 | B2 | * | 9/2005 | Joubert .................... F16B 45/00 24/265 H |
| 7,380,371 | B2 | * | 6/2008 | Jones ...................... A01G 9/128 24/129 B |
| 7,752,719 | B2 | * | 7/2010 | Howard ............... B60P 7/0823 24/132 AA |
| D657,300 | S | * | 4/2012 | Wright ........................ D12/317 |
| 8,272,108 | B2 | * | 9/2012 | Langtry ................. A44B 11/02 24/115 M |
| 9,694,877 | B2 | * | 7/2017 | Miles ...................... B63B 17/02 |
| 2008/0184533 | A1 | * | 8/2008 | Kelly ...................... B60D 1/18 24/129 R |
| 2010/0160957 | A1 | * | 6/2010 | Kirkham ............ A61B 17/1322 606/203 |
| 2015/0059131 | A1 | * | 3/2015 | Wu ...................... F16G 11/103 24/128 |
| 2015/0176678 | A1 | * | 6/2015 | Burrell ................. F16G 11/046 24/129 R |
| 2017/0057397 | A1 | * | 3/2017 | Leung .................... F16B 45/00 |
| 2017/0313232 | A1 | * | 11/2017 | Utterback ............. B60P 7/0807 |

\* cited by examiner

CORD FIXTURE

CROSS-REFERENCE TO RELATED APPLICATION

This application is a 35 USC § 371 US National Stage filing of International Application No. PCT/AU2014/000392 filed on Apr. 10, 2014, and claims priority under the Paris Convention to Australian Patent Application No. 2013204064 filed on Apr. 11, 2013.

TECHNICAL FIELD

The present invention relates to a cord fixture.

BACKGROUND OF THE DISCLOSURE

Cords such us bungee/elastic cords, ropes, lines, chains or the like can be used in many different applications. For example, cords can be used to tie objects together, secure or fix one object relative to another, secure or fix one or more objects in a desired position, move one or more objects in a desired manner and so on.

When using cords, it is often desirable to fix a portion (such as an end) of a cord relative to an object or another portion of the cord. In some cases, knots can be tied in the cord to fix the cord to itself and/or another object. Alternatively, cord fixtures can be used apply the cord in a desired manner.

One existing cord fixture is described in U.S. Pat. No. 5,682,652. U.S. Pat. No. 5,682,652 describes a pair of hooks which can be mounted on a cord. The hooks each have a cylindrical tubular member slidable along a cord and a flared slot for retaining a portion of the cord. However, in some cases the cord may not be properly held in place by the slot, thereby causing the cord to undesirably become dislodged from the hook.

The present invention is directed to a cord fixture, which may at least partially overcome at least one of the above-mentioned disadvantages or provide the consumer with a useful or commercial choice.

It will be clearly understood that, if a prior art publication is referred to herein, this reference does not constitute an admission that the publication forms part of the common general knowledge in the art in Australia or in any other country.

SUMMARY OF THE DISCLOSURE

According to one aspect of the invention, there is provided a cord fixture for attachment with a cord, the cord fixture including
 a body having at least one side wall, and
 a slot in the at least one side wall for retaining the cord therein when the cord is in a fixed condition,
  the slot having
  a neck portion, and
  an enlarged end portion, the neck portion being configured to guide the cord into the enlarged end portion such that the cord can be releasably retained within the enlarged end portion.

Advantageously, the enlarged end portion of the slot securely retains the cord therein so as to prevent accidental dislodgement of the cord when the cord fixture is in its fixed condition. Further, the slot is advantageously configured to provide a user with sensory feedback (i.e. tactile feedback) as the cord is received in the enlarged end portion so as to indicate that the cord has been inserted into the correct locking position. Moreover, the enlarged end portion of the slot evenly distributes the stresses and strains in the body of the cord fixture when the cord is under tension.

The cord may include any elongate flexible member. For example, the cord may be an elastic cord, a bungee cord, a rope, a pipe, a line, a chain, wire or the like. The cord can be made of any suitable material, such as fabric, straw, plastic, polymers, metal, or any combination thereof.

The body of the cord fixture may be any suitable shape or form. For example, the body may be a flat or curved plate. In some embodiments, the body may form part of another object, such as a container, trailer or anchor.

In one embodiment, the body includes a hollow member having a bore therethrough for receiving the cord. The hollow member may have any suitable cross-sectional shape. For example, the hollow member may have a circular, rectangular, square, triangular, or any irregular cross-sectional shape. Similarly, the bore may have any suitable cross-sectional shape. For example, the bore may have a circular, rectangular, square, triangular, or any irregular cross-sectional shape. The hollow member may be an elongate tube. The elongate tube may have a generally circular cross section with a generally circular bore therethrough. Further, the body may be slidable along the cord when the cord is in an unfixed condition.

Typically, the neck portion includes a narrowed portion of the slot. The slot may be defined by a pair of side edges. The pair of side edges may be spaced apart at one end of the slot and joined together at an opposite end of the slot. In the neck portion, the side edges may be parallel, converging/diverging, and/or one or both side edges may be curved.

In one embodiment, the neck portion of the slot may be generally V-shaped. The V-shaped neck portion may have a first open end and a second open end. The first open end may be wider than the second open end such that the side edges converge from the first open end to the second open end.

The neck portion may define a pinch point. The pinch point may be configured to prevent the cord from being dislodged from the enlarged end portion when the cord fixture is in the fixed condition. In particular, the pinch point may be defined at the second end of the neck portion. The cord or the pinch point may require some temporary deformation to allow passage of the cord.

The enlarged end portion may be of any suitable shape or form. For example, the enlarged end portion may be generally circular, square, rectangular, triangular, star shaped, or have any irregular shape. Preferably, the enlarged end portion is generally circular. The enlarged end portion is typically sized to match or closely match the diameter of a standard cord size, for example a common standard bungee cord size.

The enlarged end portion may be located in any suitable position relative to the neck portion. For example, the enlarged end portion may be positioned in line or transversely to a lengthwise direction of the neck portion. The enlarged end portion may be in line with a centerline of the neck portion. Alternatively, the enlarged end portion may be positioned to one side of the neck portion. Preferably, the enlarged end portion is proximate the second end of the neck portion.

In one embodiment, the enlarged end portion of the slot includes two parts having a narrowed portion or secondary pinch point therebetween. The two parts may be circular or any other suitable shape (e.g. square, rectangular, triangular, star shaped, or have any irregular shape). The two parts may be arranged in any suitable position and orientation with respect to one another. For example, the two parts may be arranged adjacent the second end of the neck portion. The two parts may be arranged in series and in line along a lengthwise direction of the slot. Alternatively, the two parts may be arranged transversely to the lengthwise direction of the slot. In one example, the two parts may be arranged on one or either side of the neck portion.

The two parts may be any suitable size. One part may be larger or smaller than the other part. Typically, a first part located immediately adjacent the neck portion is larger in diameter than a circular part located immediately adjacent the first circular part.

As mentioned above, the slot may have an enlarged end portion which may include one or more parts. Normally, each part will be a substantially circular opening in order to receive a typically substantially circular cross-section cord. A particularly preferred cord is an elastic cord composed of one or more elastic strands forming a core, usually covered in a woven cotton or polypropylene sheath. The sheath normally does not materially extend elastically, but it is braided with its strands spiraling around the core so that a longitudinally applied force causes the sheath to squeeze the core, transmitting the core's elastic compression to the longitudinal extension of the sheath and cord.

According to a particularly preferred embodiment, each opening part of the enlarged end portion will preferably have an angled entryway in the direction of the cord. In other words, it is preferred that the opening part is angled from an inner side to an outer side. It is particularly preferred that the opening part converges from an inner side to an outer side. A portion of the periphery that forms the opening part of the enlarged end portion on an outer side of the cord fixture will preferably define an engagement edge which engages the cord.

In this way, a longitudinally applied force which is applied to the cord such as to pull cord tighter (that is in the direction from the inner side towards the outer side), will typically draw the cord from a larger dimensioned inner edge of the opening part to order and past a smaller dimensioned outer edge of the opening part. Due to the fact that the longitudinally applied force is applied, the sheath generally squeezes the core which compresses the core slightly, allowing the cord to more easily pass through the opening part.

Once released or slackened, the sheath squeezes the cord to a lesser extent which allows the core to expand radially which then preferably forces the sheath against the edge of the opening part to retain the cord in position through friction between the sheath and the engagement edge of the opening part. Any force which is applied in the opposite direction, such as through tension of the cord or through any movement of the structure to which the cord is attached, will force the sheath against the engagement edge more tightly holding the cord in position. The opening part is preferably appropriately dimensioned to allow forced passage when a force is applied longitudinally outwardly (while the cord undergoes some minor compression) and to resist movement in an opposite direction.

Advantageously, a single cord fixture is configured to accommodate cords of different diameters. In particular, a first cord with a larger diameter can be inserted into the first part of the enlarged end portion. If the diameter of the second part of the neck portion is too small to receive the first cord, the first cord is retained in the first part rather than the second part. Similarly, a second cord with a smaller diameter can be inserted into the second part. If the diameter of the first pan is too large to securely retain the second cord, the second cord is passed through the first part until it is received in the second part, which would be sized to securely retain the second cord. In this manner, the single cord fixture may advantageously retain either the first cord or the second cord at any one time. Alternatively, the cord fixture may advantageously retain both the first cord and the second cord simultaneously.

The enlarged end portion may have more than two parts as discussed above. Indeed, the enlarged end portion may include three, four or more parts, each separated from an adjacent part by a narrow portion and each having a different size (e.g. diameter) such that a cord can be inserted into the most suitably sized part of the enlarged end portion to be securely retained therein. Advantageously, a single cord fixture can thereby retain one or more cords of different diameters independently or simultaneously.

In another embodiment, the two or more parts may be of the same size. Advantageously, the cord fixture can thereby retain one or more cords of the same diameter independently or simultaneously.

The cord fixture may further include a fastener portion projecting from the body. The fastener portion may include one or more hooks, clamps, clips, pins, rings, or the like for fastening the cord fixture to another object. Typically, the fastener portion includes a hook. The hook may have an arc angle of greater than 180°.

The fastener portion may be integral with the body of the cord fixture. The cord fixture may include one or more handles. Each handle may be of any suitable shape or form. For example, a handle may be a rod, bar, hook, stub or the like so as to facilitate holding and orientating the cord fixture and fastener portion. Typically, the handle has an eyelet sized for receiving a portion of a user's finger. The fastener portion may include a handle. The handle may be integral with the fastener portion.

The fastener portion may be located in any suitable position on the body of the cord fixture. The fastener portion may be located adjacent or spaced from the slot, and/or located on one side or end of the body opposite to the slot.

The cord fixture may include two or more slots for retaining two or more portions of a single cord, or two or more cords concurrently. In particular, the body of the cord fixture may include two hollow tubes, each hollow tube having a side wall including a slot for retaining a cord therein. In another embodiment, the body of the cord fixture may include a plate, the plate defining two or more slots for retaining two or more cord portions therein.

The cord fixture may be made from any suitable material. For example, plastic, metal, wood, composite material. Typically, the cord fixture is made from plastic. The cord fixture may be moulded in one piece.

According to another aspect of the invention, there is provided a method of attaching a cord fixture to a cord, the method including inserting the cord into a slot in a side wall of the cord fixture, guiding the cord via a neck portion of the slot into an enlarged end portion of the slot, and releasably retaining the cord within the enlarged end portion of the slot.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 5a is a perspective view of the embodiment of the cord fixture shown in FIG. 3a.

DETAILED DESCRIPTION OF THE DISCLOSURE

Figure 1:
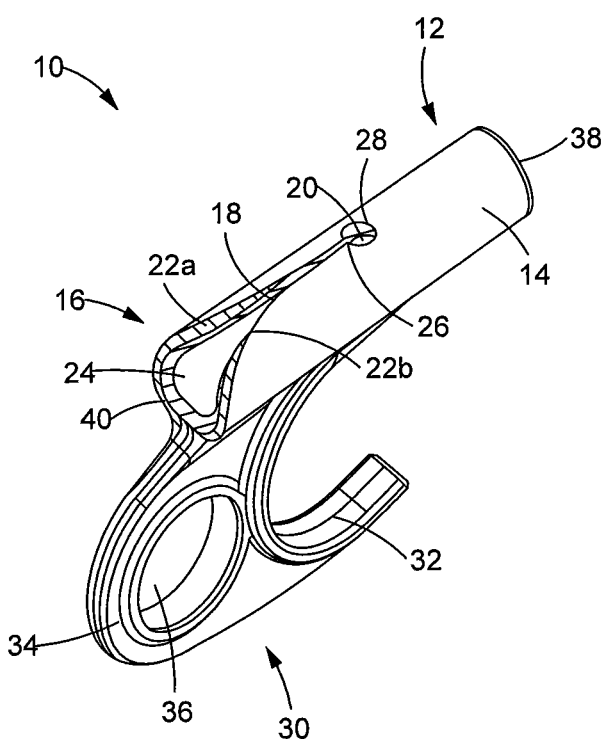
FIG. 1 is a perspective view of a cord fixture according to one embodiment of the present invention.

FIG. 1 illustrates a cord fixture 10 for attachment with a cord (not shown). The cord fixture 10 includes a hollow body 12 in the form of a hollow tube defining a bore. The hollow body 12 has a side wall 14, and a slot 16 in the side wall 14 for retaining the cord when the cord is in a fixed condition. In particular, the slot 16 has a neck portion 18 and an enlarged circular end portion 20 adjacent one end of the neck portion.

When attaching a cord to the cord fixture 10, one end portion of the cord is first inserted through the bore of the hollow body 12 and then transversely inserted into the slot. In the slot, the end portion of the cord is guided through the neck portion 18 into the enlarged end portion 20 such that the cord can be releasably retained within the enlarged end portion 20.

The slot 16 is defined by a pair of side edges 22a, 22b. The side edges 22a, 22b converge from an open end 24 of the slot 16 to a pinch point 26 of the slot 16 thereby defining a generally V-shaped neck portion 18. The side edges 22a, 22b then diverge to define a circular opening (i.e. the enlarged circular end portion 20) before joining together at a closed end 28 of the slot 16.

A hook portion 30 projects from a side of the hollow body 12 opposite to the slot 16. The hook portion 30 includes a hook 32, which has an arc angle of greater than 180°, and a handle 34. The handle 34 defines an eyelet 36 sized to receive a portion of a user's finger.

The cord fixture 10 is moulded from plastic in one piece. A small level of flexibility may be present in the side edges 22a, 22b of the slot 16 to facilitate the cord passing through the slot 16 in use.

When using cord fixture 10, a cord can be attached to the cord fixture by first inserting the cord into the bore of the hollow body 12 by threading an end portion of the cord from a first end 38 to a second end 40 of the hollow body 12. Then, the end portion of the cord near the second end 40 of the hollow body is orientated in a direction transverse to the axis of the hollow body 12 and inserted into the slot 16. The neck portion 18 of the slot 16 then guides the cord into the enlarged circular end portion 20 so that it can be securely retained therein.

Once the cord is securely attached to the cord fixture 10, the cord can be attached or fixed to an object or structure via the hook portion 30. In particular, a user can insert his/her finger into the eyelet 36 so as to maneuver the cord fixture 10 and the hook portion 30 in the desired manner before attaching the hook 32 to an attachment point on an object or structure. If the opposite end of the cord is fixed, the handle 34 conveniently allows a user to easily control the orientation and position of the cord fixture 10 and hook portion 30 against tension in the cord.

To release the cord from the cord fixture 10, the end portion of the cord is simply forced out of the enlarged circular end portion 20 and the neck portion 18 of the hollow body 12 by a pulling force. Once released from the slot 16, the cord can be pulled out of the hollow body 12 from the second end 40 to the first end 38.

Advantageously, the enlarged circular end portion 20 of the slot securely retains the cord therein so as to prevent accidental dislodgement of the cord when the cord is in its fixed condition. Further, the slot 16 is advantageously configured to provide a user with sensory feedback (i.e. tactile feedback) as the cord is received in the enlarged end portion 20 so as to indicate that the cord has been inserted into the correct locking position.

Without the enlarged circular end portion 20 (i.e. if the slot 16 finished at the end of the neck portion 18), it would be difficult to assess whether the cord is securely held in the slot 16. In some instances, a user may not have enough strength to pull the cord as far back along the slot 16 as necessary to properly secure the cord in the slot 16, which may cause the cord to become undesirably dislodged from the slot and the cord fixture. Further, a slot without enlarged circular end portion 20 may not provide sufficient grip to retain the cord therein. Indeed, the enlarged circular end portion 20 can be sized to match or closely match the diameter of a standard and commonly used bungee cord such that the side walls 22a, 22b of the enlarged circular end portion 20 firmly engage and hold the cord. The narrow pinch point 26 also facilitates in securing the cord within the enlarged circular end portion 20.

Moreover, the enlarged end portion evenly distributes the stresses and strains in the body of the cord fixture when the cord is under tension. Without the enlarged circular end portion 20, a high level of stress and strain will be concentrated at the pinch point 26 of the slot 16. After repeated use, such high levels of stress and strain would increase wear and tear of the cord fixture and reduce its operating life. In some instances, such high levels of stress and strain concentrated at the pinch point 26 may cause the hollow body 12 of the cord fixture to crack and break. To achieve the necessary toughness and durability, tougher, stronger and/or more material is required to make a cord fixture without enlarged circular end portion 20 (in comparison to a cord fixture having an enlarged circular end portion 20 as described herein), which increases the cost of manufacture.

Figure 2:
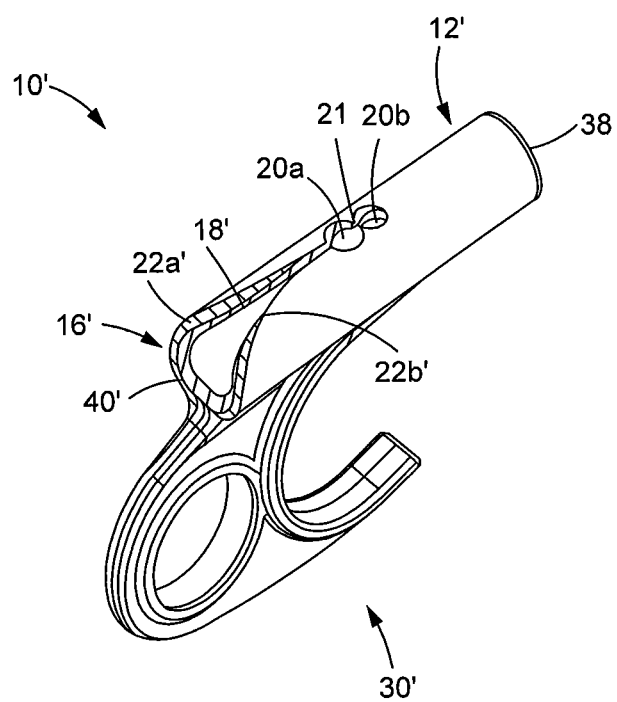
FIG. 2 is a perspective view of a cord fixture according to another embodiment of the present invention.

FIG. 2 illustrates a cord fixture 10' according to another embodiment of the invention. In FIG. 2, like numerals refer to like features previously described.

The cord fixture 10' is similar to cord fixture 10 and operates in a similar manner. The cord fixture, 10' is different to cord fixture 10 of FIG. 1 in that the slot 16' includes a neck portion 18 and two circular portions 20a, 20b separated by a narrow portion 21. The two circular portions 20a, 20b, are arranged in series along a lengthwise direction of the slot 16'. Circular portion 20a has a larger diameter than circular portion 20b.

The two circular portions 20a, 20b advantageously allow the cord fixture 10' to be attachable to cords of two different diameters. The narrow portion 21 effectively creates a second pinch point between the two circular portions 20a, 20b so that a cord can be securely retained in either circular portion 20a or 20b.

When using cord fixture 10', a cord can be attached to the cord fixture 10' by first inserting the cord into the bore of the hollow body 12'. Then, an end portion of the cord near the second end 40' of the hollow body is orientated in a direction transverse to the axis of the hollow body 12' and inserted into slot 16'. The neck portion 18' of the slot 16' then guides the cord into the circular portion 20a. If the diameter of the cord generally matches the diameter of circular portion 20a, the cord is then securely retained in circular portion 20a. However, if the diameter of the cord is smaller than the diameter of circular portion 20a such that the edges 22a, 22b of circular portion 20a do not properly engage and hold the cord, the cord is pulled further into circular portion 20b. As circular portion 20b has a smaller diameter than circular portion 20a, the cord can be securely retained in circular portion 20b.

Once the cord is securely attached to the cord fixture 10', the cord can be attached or fixed to an object or structure via the hook portion 30' in the same manner as that previously described.

To release the cord from the cord fixture 10', the end portion of the cord is simply forced out of the corresponding circular portion 20a, 20b and the neck portion 18 of the hollow body 12' by a pulling force. Once released from the slot 16', the cord can be pulled out of the hollow body 12'.

Advantageously, the cord fixture 10' can accommodate two cords of different diameters. As described, a first cord with a larger diameter can be retained in circular portion 20a and a second cord with a smaller diameter can be retained in circular portion 20b.

In other embodiments of the invention, the cord fixture 10' may have more than two circular parts 20a, 20b. The cord fixture 10' may have several circular parts arranged in series in a manner similar to that shown in FIG. 2. The circular parts would have decreasing diameter towards the first end 38' of the hollow body 12'.

In another embodiment of the invention, the two or more circular parts of the cord fixture 10' may have the same diameter such that multiple cord portions can be retained simultaneously in cord fixture 10'.

Figure 3A:
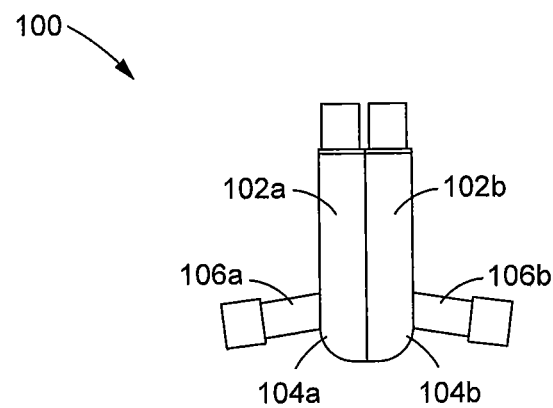
FIG. 3a is a side view of a cord fixture according to another embodiment of the present invention.
Figure 5A:
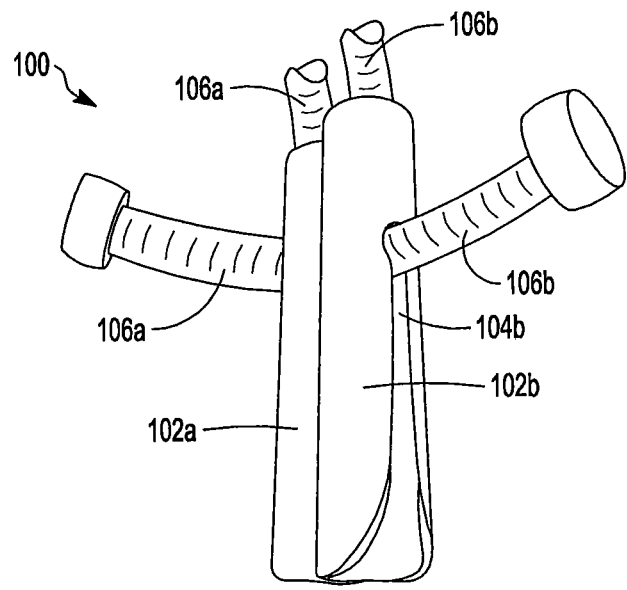

FIG. 3a illustrates a side view and FIG. 5a illustrates a perspective view of the cord fixture 100 according to a further embodiment of the invention. The cord fixture 100 includes two hollow tubular portions 102a, 102b. Each tubular portion 102a, 102b includes a side wall defining a slot 104a, 104b. Each slot 104a, 104b may be configured in the same or a similar manner as the slots 16, 16' shown in FIGS. 1 and 2.

Each tubular portion 102a, 102b and the corresponding slot 104a, 104b operates with and retains a cord portion in the same manlier as hollow body 12, 12' described above with reference to FIGS. 1 and 2. As shown in FIG. 3a, a first cord 106a can be threaded through the hollow tubular portion 102a and guided though a neck portion of the slot 104a to be received and retained in an enlarged end portion of the slot 104b. Similarly, a second cord 106b can be threaded through the hollow tubular portion 102b and guided though a neck portion of the slot 104b to be received and retained in an enlarged end portion of the slot 104b.

Figure 3B:
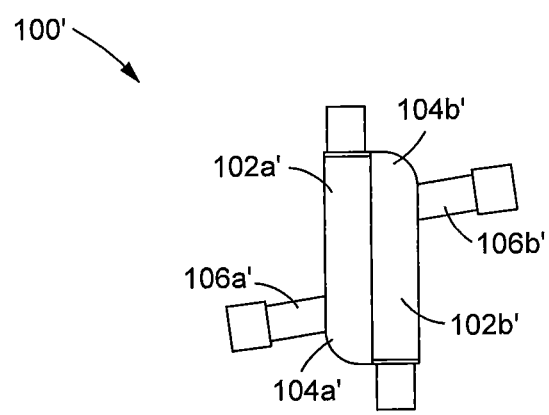
FIG. 3b is a side view of a cord fixture according to a further embodiment of the present invention.
Figure 5B:
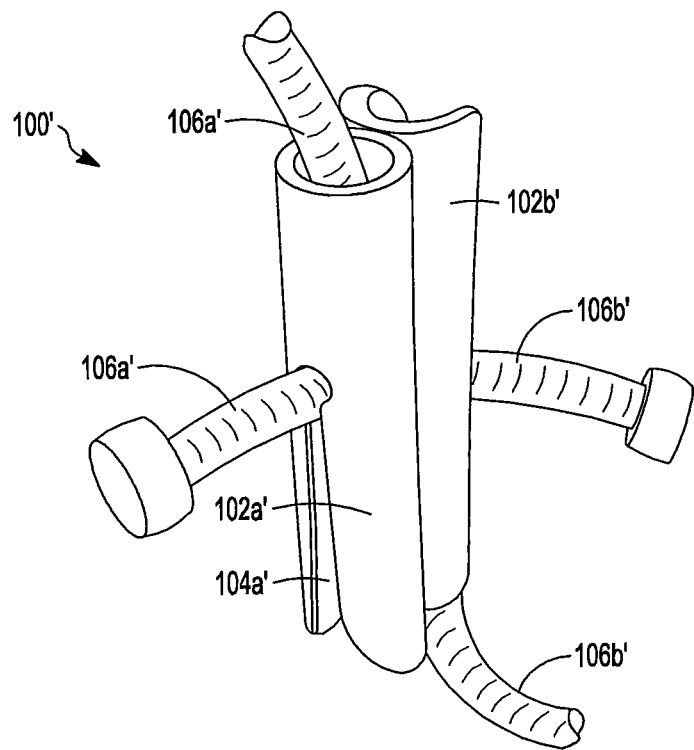
FIG. 5b is a perspective view of the embodiment of the cord fixture shown in FIG. 3b.

FIG. 3b illustrates a side view and FIG. 5b illustrates a perspective view of a cord fixture 100' according to another embodiment of the present invention. Like references in FIGS. 3b and 5b refer to like features previously described in FIGS. 3a and 3b.

The cord fixture 100' operates according to the same principles as cord fixture 100. However, the orientation of the hollow tubular portion 102b' is changed such that the slots 104a' and 104b' are arranged on opposite ends of the cord fixture 100' and facing opposite directions.

Advantageously, cord fixtures 100, 100' can be used to retain two cords 106a, 106b extending from the same direction or opposite directions.

In other embodiments, a cord fixture 100 may include more than two hollow tubular portions 102 to retain more than two cord portions 106.

Figure 4:
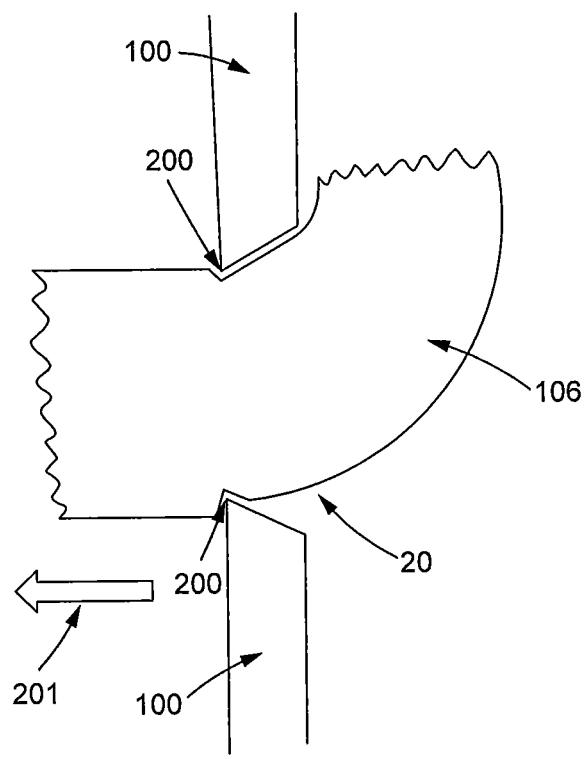
FIG. 4 is a schematic section view of an opening in a cord fixture according to a particularly preferred embodiment of the present invention.

In the alternative embodiment illustrated in FIG. 4, each enlarged circular end portion 20 is a substantially circular opening in order to receive a typically substantially circular cross-section cord 106. The preferred cord is an elastic cord 106 composed of one or more elastic strands forming a core covered in a woven cotton or polypropylene sheath. The sheath does not materially extend elastically, but it is braided with its strands spiraling around the core so that a longitudinally applied force causes the sheath to squeeze the core, transmitting the core's elastic compression to the longitudinal extension of the sheath and cord.

According to the embodiment illustrated in FIG. 4, the enlarged circular end portion 20 has an angled entryway provided in the direction of the cord 106. In other words, the enlarged circular end portion 20 converges or narrows from an inner side to an outer side. A portion of the periphery of the cord fixture 100 that forms the enlarged circular end portion 20 on an outer side of the cord fixture 100, defines an engagement edge 200 which engages the cord 106.

In this way, a longitudinally applied force which is applied to the cord such as to pull cord tighter (that is in the direction from the inner side towards the outer side as indicated by arrow 201), draws the cord 106 from a larger dimensioned inner edge of the enlarged circular end portion 20 past a smaller dimensioned engagement edge 200 of the enlarged circular end portion 20. Due to the fact that the longitudinally applied three is applied, the sheath of the cord generally squeezes the core of the cord which compresses the core slightly, allowing the cord to more easily pass through the engagement edge 200 while the force is applied.

Once released or slackened, the sheath of the cord squeezes the cord to a lesser extent which allows the core to expand radially, forcing the sheath against the engagement edge 200 to retain the cord 106 in position through friction between the sheath and the engagement edge 200 of the enlarged circular end portion 20. Any force which is applied in the opposite direction, such as through tension of the cord 106 or through any movement of the structure to which the cord is attached, forces the sheath against the engagement edge 200 holding the cord in position.

In practice, this configuration means that when the cord is located in the enlarged circular end portion 20, the cord can still be pulled through the opening to tighten the cord, but the cord resists movement in the opposite direction, preferably requiring removal of the cord from the enlarged circular end portion 20 before the cord can be loosened.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A cord fixture for attachment to a cord, the cord fixture including:
    a body having:
        at least one side wall defining a central bore extending longitudinally through the body,
        a cord entry opening and a cord exit opening through which a free end of the cord extends, and
        a slot extending through the at least one side wall and extending partially over a length of the body, the slot having:
            an elongate converging portion in communication with the cord exit opening,
            a narrowed neck portion, and
            an enlarged end portion for engaging the cord and retaining the cord therein when the cord is in a fixed condition, the enlarged end portion provided at an end of the narrowed neck portion closest to the cord entry opening of the body, the elongate converging portion being configured to guide the cord to the narrowed neck portion and then into the enlarged end portion such that the cord can be releasably retained within the enlarged end portion, and the cord being released from the enlarged end portion by movement of the cord back through the narrowed neck portion,
    wherein the enlarged end portion angles inwards from a larger dimension at an inner side surface of the at least one side wall to a smaller dimension at an outer side surface of the at least one side wall through the at least one sidewall in order to define an engagement edge on the outer side surface, the engagement edge configured to engage the cord and allow passage of the cord in one direction from the inner side surface to the outer side surface but resist passage of the cord in an opposite direction.

2. A cord fixture according to claim 1, wherein the body includes a hollow member defining the central bore therethrough for receiving the cord.

3. A cord fixture as claimed in claim 2, wherein the hollow member is an elongate tube.

4. A cord fixture according to claim 1, wherein the body is slidable along the cord when the cord is in an unfixed condition.

5. A cord fixture according to claim 1, wherein the neck portion of the slot is generally V-shaped.

6. A cord fixture according to claim 1, wherein the neck portion defines a pinch point, the pinch point being configured to prevent the cord from being dislodged from the enlarged end portion when the cord fixture is in the fixed condition.

7. A cord fixture according to claim 1, wherein the enlarged end portion is generally circular.

8. A cord fixture according to claim 1, wherein the enlarged end portion of the slot includes two or more circular parts having a secondary narrowed portion therebetween.

9. A cord fixture as claimed in claim 8, wherein the two or more circular parts are located in series along a lengthwise direction of the slot.

10. A cord fixture as claimed in claim 8, wherein a first circular part located immediately adjacent the neck portion is larger in diameter than a second circular part located immediately adjacent the first circular part.

11. A cord fixture according to claim 1, wherein the at least one side wall defines two or more slots, each slot being configured for retaining a cord portion therein.

12. A cord fixture according to claim 1, further including a fastener portion projecting from the body.

13. A cord fixture as claimed in claim 12, wherein the fastener portion is integral with the body.

14. A cord fixture as claimed in claim 12, wherein the fastener portion includes a hook portion.

15. A cord fixture as claimed in claim 12, wherein the fastener portion includes two or more hook portions.

16. A cord fixture as claimed in claim 14, wherein each hook portion has an arc angle of greater than 180°.

17. A cord fixture as claimed in claim 12, wherein the fastener portion includes a handle.

18. A cord fixture as claimed in claim 17, wherein the handle has an eyelet sized to receive a portion of a finger.

19. A cord fixture as claimed in claim 12, wherein the fastener portion projects from a side of the body opposite to the slot.

20. A cord fixture according to claim 1, wherein the cord fixture is molded in one piece.

21. A method of attaching a cord fixture to a cord, the method including:
    inserting the cord into a slot in a side wall of the cord fixture, the cord fixture including a body having:
        the side wall defining a central bore extending longitudinally through the body;
        a cord entry opening and a cord exit opening through which a free end of the cord extends; and
        a slot extending through the side wall and extending partially over a length of the body, the slot having:
            an elongate converging portion in communication with the cord exit opening;
            a narrowed neck portion; and
            an enlarged end portion for engaging the cord and retaining the cord therein when the cord is in a fixed condition, the enlarged end portion provided at an end of the narrowed neck portion closest to the cord entry opening of the body, the elongate converging portion being configured to guide the cord to the narrowed neck portion and then into the enlarged end portion such that the cord can be releasably retained within the enlarged end portion, and the cord being released from the enlarged end portion by movement of the cord back through the narrowed neck portion,
    wherein the enlarged end portion angles inwards from a larger dimension at an inner side surface of the at least one side wall to a smaller dimension at an outer side surface of the at least one side wall through the at least one sidewall in order to define an engagement edge on the outer side surface, the engagement edge configured to engage the cord and allow passage of the cord in one direction from the inner side surface to the outer side surface but resisting passage of the cord in an opposite direction;

guiding the cord via the narrowed neck portion of the slot into the enlarged end portion of the slot, and releasably retaining the cord within the enlarged end portion of the slot wherein the cord is released from the enlarged end portion by movement of the cord back through the narrowed neck portion.

22. A cord fixture as claimed in claim 1, wherein the cord is tensioned through the application of a force thereto while retained in the enlarged portion.

23. A cord fixture assembly, the cord fixture assembly including:
 a cord; and
 a cord fixture including:
  a body having:
   at least one side wall defining a central bore extending longitudinally through the body,
   a cord entry opening and a cord exit opening through which a free end of the cord extends, and
   a slot extending through the at least one side wall for retaining the cord therein when the cord is in a fixed condition, the slot having:
    an elongate converging portion,
    a narrowed neck portion, and
    an enlarged end portion for engaging the cord and retaining the cord therein when the cord is in a fixed condition, the enlarged end portion provided at an end of the narrowed neck portion closest to the cord entry opening end of the body, the elongate converging portion being configured to guide the cord to the narrowed neck portion and then into the enlarged end portion such that the cord can be releasably retained within the enlarged end portion, and the cord released from the enlarged end portion by movement of the cord back through the narrowed neck portion,
  wherein the enlarged end portion angles inwards from a larger dimension at an inner side surface of the at least one side wall to a smaller dimension at an outer side surface of the at least one side wall through the at least one sidewall in order to define an engagement edge on the outer side surface, the engagement edge configured to engage the cord and allow passage of the cord in one direction from the inner side surface to the outer side surface but resisting passage of the cord in an opposite direction.

* * * * *